Figure 1:
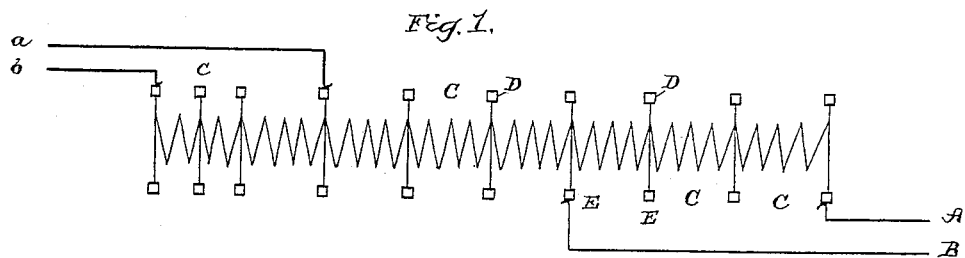

(No Model.)

E. THOMSON.
ELECTRIC POTENTIAL DIFFERENTIATOR.

No. 391,437. Patented Oct. 23, 1888.

WITNESSES:
Ira R. Steward.
Wm. H. Capel.

INVENTOR,
Elihu Thomson.
BY
Townsend & MacArthur,
ATTORNEYS.

UNITED STATES PATENT OFFICE.

ELIHU THOMSON, OF LYNN, MASSACHUSETTS.

ELECTRIC POTENTIAL DIFFERENTIATOR.

SPECIFICATION forming part of Letters Patent No. 391,437, dated October 23, 1888.

Application filed August 15, 1888. Serial No. 282,805. (No model.)

*To all whom it may concern:*

Be it known that I, ELIHU THOMSON, a citizen of the United States, and a resident of Lynn, in the county of Essex and State of Massachusetts, have invented a certain new and useful Electric Potential Differentiator, of which the following is a specification.

The object of my invention is to provide a means whereby alternating, pulsating, or intermittent currents of any potential may be converted into any one of a large number or a range of potentials different from that of the original or impressing current, and either greater or less than the same.

The object of the invention is also to obtain from a given applied potential either of a range of potentials which are fractions of the impressing potentials or reciprocals of such fractions. Thus, for instance, by the construction hereinafter described it is easy to obtain a current which will have one-tenth, one-twentieth, one-thirtieth, &c., of the applied potential, or ten, twenty, thirty, &c., times such potential and a large number of fractions thereof, the relation of potentials being expressed by the general term $\frac{n}{n'}$, in which $n$ and $n'$ are variable, limited only in number by the extent or nature of the subdivision of the coil. In the case of a coil divided into equal divisions $n$ may be any number which is a whole or complete multiple of one subdivision thereof. In the case of a coil two or more of whose subdivisions are each of different value the variations are capable of greater extension. In any case the number of variables is a matter of simple calculation and depends upon the number of ways in which the coils may be included in the circuit singly or two or more together.

My invention consists in the combination, with two or more coils of definite capacity, size, or relation placed in preferably the same inductive relation to one another, as on the same core, of suitable means for connecting one or more of the coils into a primary or impressing circuit, and suitable means for connecting one or more (the same or different coils) into a secondary or impressed circuit.

My invention may obviously be carried out by employing one set of coils as the primary only and another set as the secondary only; but I prefer to use an electro-magnetic coil divided into sections of definite relation, which by suitable switching or connecting devices may be used either as primary or secondary, and may be assembled in different aggregations to produce the desired differences in the length or capacity of either the primary or secondary circuit, as will be hereinafter described.

To illustrate the principle of my invention, I will begin with a simple form of coil.

Let us wind upon an iron core or inclose in iron, as usual, or place upon a closed ring-core properly subdivided by laminations or otherwise, a coil divided into four equal sections and provide contact-points at each section, so that the connections of the circuit giving the impressing electro-motive force or potential to be converted or changed can be varied to include one, two, three, or four sections of the coil between these connections. Similarly the connections from which the induced electro-motive force is taken may be similarly changed to include one, two, three, or more sections between them. In such an apparatus it will be possible to obtain induced electro-motive force of $\frac{1}{4}, \frac{1}{2}, \frac{3}{4}, \frac{4}{4}, \frac{4}{3}, \frac{2}{1}, \frac{4}{1}, \frac{1}{3}, \frac{2}{3}, \frac{3}{2}$, or $\frac{4}{2}$, &c., of the impressing electro-motive force. Let, however, the coil be divided into ten sections, and the variations can be made by halves, thirds, fourths, fifths, sixths, sevenths, eighths, ninths, or tenths, as may be, or by the reciprocals of such fractions. Such range includes all fractions having as numerator and denominator any integral from one to ten. If, however, the coil be divided into unequal but definite fractions of its length instead of into equal portions, the range and relation of the fractioning of potentials may be changed or extended.

A useful disposition is to divide the coil into, say, a number of equal fractions, and again subdivide one or more of these fractions into halves, thirds, fourths, or the like, and to provide suitable intermediate connections. For instance, a coil having sections each one-eighth of the whole coil may have one of its sections divided into halves. This simple modification doubles the capacity of the coil and increases the range of fractioning up to sixteenths and reciprocals of sixteenths. With a coil of ten sections, one or other of whose sections are divided into halves or thirds or fourths, the range is increased as far as twentieths, thirtieths, fortieths, and reciprocals.

Figure 2:
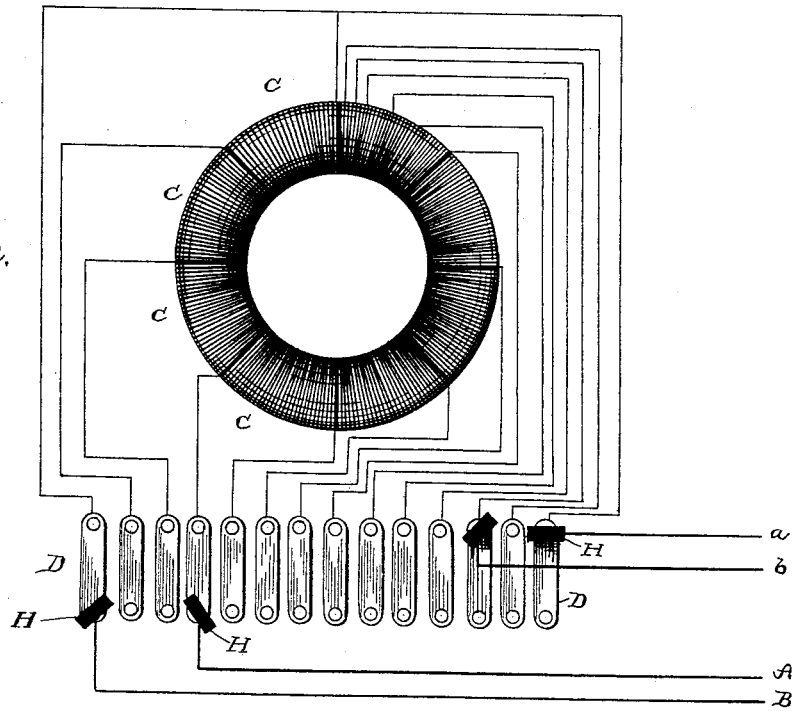

In the accompanying drawings, Figure 1 is a diagram illustrative of my invention. Fig. 2 illustrates in plan an apparatus embodying my invention.

Referring to Fig. 1, eight equal magnetic coils are indicated by the letter C, joined together as a continuous coil and having connections, as shown, to two sets of contacts, D. A B indicate conductors forming terminals or poles of a secondary or impressed circuit, and $a\,b$ terminals or wires having a current of given potential, which is to be converted into a current of different potential on the circuit of A B. One of the sections of one-eighth is shown as subdivided for the purpose, before stated, of increasing the capacity of the apparatus. It is obvious that by changing the connections of A B, so as to include all or different numbers of coils of the whole set, the potential on A B is varied, while further changes may be obtained by varying the number of sections or sub-sections, or both, included between the terminals $a\,b$.

If the wires or connections A B have the capacity for connection to any of the sections and the wires $a\,b$ to any of the sections, a full capacity of adjustment will exist. This is supposed to be the condition in Fig. 1, wires A B being adapted to be included in a circuit between any part of or the whole number of coils and $a\,b$ to be connected to include all or a part of the whole number. It is quite obvious that a single line of connecting-contacts D D would serve the purpose of the invention; but it is preferable to have a set of contacts assigned for connection only of the impressing and another set for the impressed circuit.

Fig. 2 shows a preferred form of my invention. A circular or endless core is provided with a divided coil whose points of division are connected to contact or connecting plates D, each having two sockets, one for connection of a wire, A or B, and the other for the connection of a wire, $a$ or $b$. The connection is made conveniently by the usual and well-known appliance of plugs H, flexibly or otherwise connected with the circuit terminals. The main divisions of the coils are eight in number, as indicated. One of them is divided into quarters, and one of such quarters is subdivided into thirds, thereby further largely increasing the number of differences of potential of the circuits A B $a\,b$ which it is possible to establish.

What I claim as my invention is—

1. An electric potential differentiator consisting of coils or sections of a coil of definite length or capacity, which coils are in inductive relation to one another, connecting devices for connecting any one or more of the coils or divisions to a supplying or impressing circuit, and connecting devices for connecting one or more of the said coils or divisions to a secondary or impressed circuit.

2. An electric potential differentiator consisting of a magnetic coil divided into sections bearing a definite relation to one another, means for connecting any one or more sections to an impressing circuit, and means for connecting any one or more of the sections to a secondary or impressed circuit, as and for the purpose described.

3. In an electric converter, a coil divided into a number of equal sections, one or more of which sections are further divided into sub-sections, and means for including any one or more of such sections and sub-sections in an external electric circuit, primary or secondary.

4. An electric converter or differentiator consisting of a continuous coil wound on an endless core and divided into sections, and a series of connecting switch-studs or contacts with any two of which the terminals of a primary or secondary circuit may be simultaneously connected, such studs or contacts being joined to the divisions of the sections.

Signed at Lynn, in the county of Essex and State of Massachusetts, this 13th day of August, A. D. 1888.

ELIHU THOMSON.

Witnesses:
J. W. GIBBONEY,
A. L. ROHRER.